Figures 1, 2:
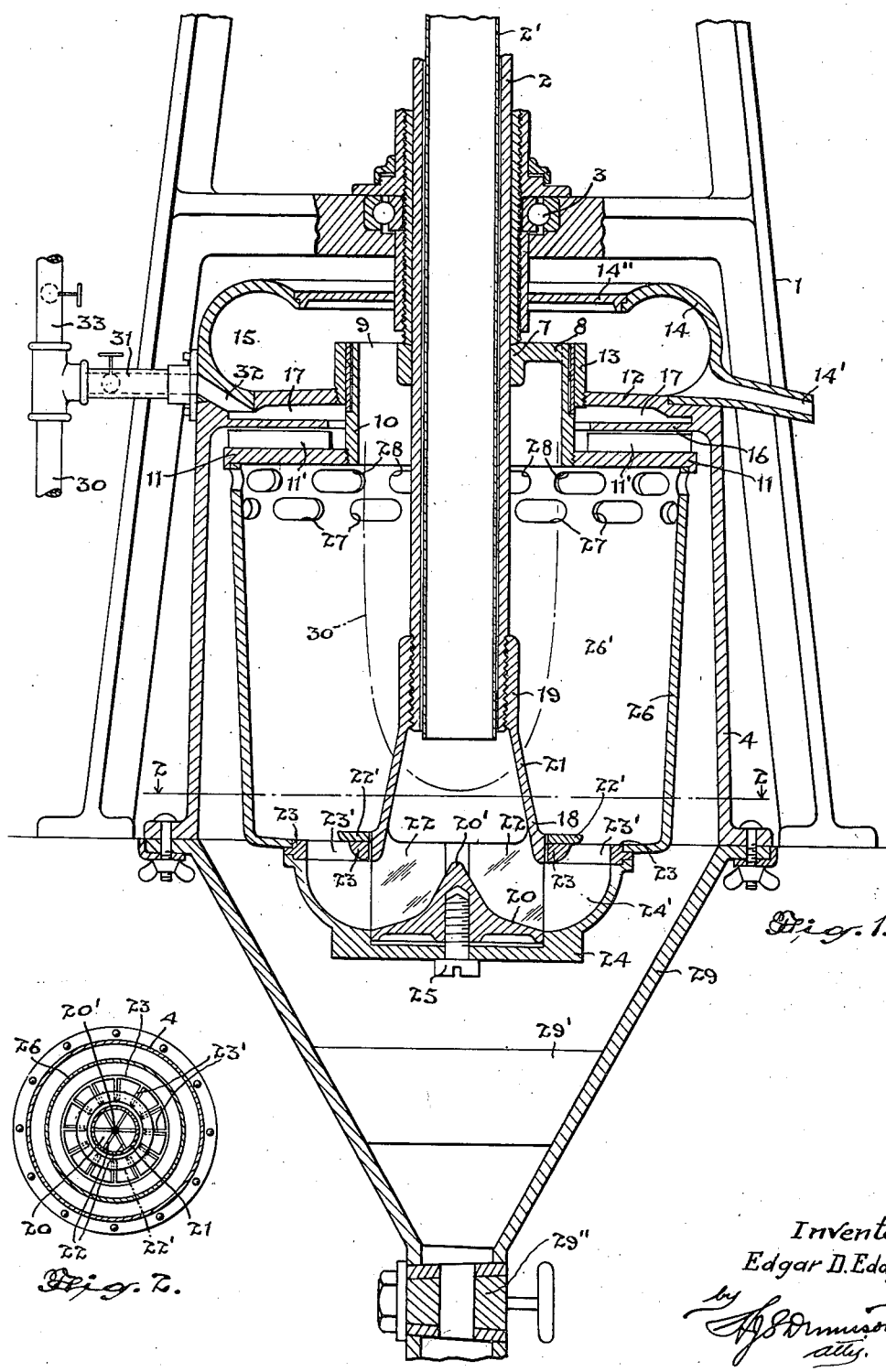

Sept. 16, 1941.  E. D. EDDY  2,256,316

SEED CLEANER

Filed March 17, 1939

Inventor:
Edgar D. Eddy.

Patented Sept. 16, 1941

2,256,316

UNITED STATES PATENT OFFICE 2,256,316

SEED CLEANER

Edgar D. Eddy, Toronto, Ontario, Canada, assignor to Eddy Seed Cleaners, Limited, Toronto, Ontario, Canada Application March 17, 1939, Serial No. 262,334

5 Claims. (Cl. 233—14)

The principal objects of the present invention are to provide an improved form of apparatus for separating seeds, grains and the like on the basis of their comparative specific gravities and to ensure a more effective and uniform segregation of materials such as: (a) good seeds of cultivated plants from weed seeds, spores of plant diseases such as ergot and smut, inert matter, lighter and inferior seeds of the same kind, and other and lighter kinds of cultivated plant seeds; (b) good sound peas or other grains from peas or other grains that may have been affected by weevils, moulds or other injuries that alter the specific gravity; (c) peas, beans and the like that are at the stage of maturity to give the desired quality and uniform grade when canned, from the ones that are over-mature and of inferior canning quality; (d) peas that are threshed green for canning, from thistle tops and other foreign matter, thus eliminating or greatly reducing the work of hand picking; (e) other solid particles of suitable size, the specific gravities of which are different but such that a suitable liquid is obtainable, the specific gravity of which is intermediate between those of the two kinds of particles to be separated.

The principal features of the invention reside in the novel construction and arrangement of parts and in the method of separation whereby the seeds or grains to be classified, together with the fluid of the required specific gravity, are introduced into the receiving and distributing section of a rapidly rotating, fluid-filled chamber in such a manner that the seeds are directed into the smaller end of a rotating divergent-walled chamber in a direction substantially parallel with its axis, where, under the influence of centrifugal force, the seeds of greater specific gravity than that of the surrounding liquid are thrown outward to and then directed along the inner divergent wall surface of the rotating chamber to discharge outlets in this wall at or near the end opposite to where the seeds entered, while the seeds of lower specific gravity than that of the surrounding fluid are displaced toward the central zone of the rotating chamber and are carried to a separate discharge by the current produced in this zone by the flow and discharge of the fluid introduced into the chamber with the seeds to be separated.

A further and important feature resides in the novel construction of the seed-distributing means whereby the seeds delivered thereinto are caused to rotate in unison with the rotating separating chamber and to be widely and evenly dispersed prior to being directed into the separating chamber in a direction substantially parallel with its axis.

In my prior United States Patents 1,430,293 granted September 26, 1922 and 1,452,457 granted April 17, 1923, I have shown and described an apparatus for separating or classifying seeds or the like, utilizing the effect of centrifugal force to classify the seeds while the latter were suspended in a rotating fluid body. In the operation of this apparatus it has been found that with certain seeds, particularly those of comparatively large size such as peas, beans and other grains, the separation may be imperfect because the course that the individual seeds would take in the separation chamber solely under the influence of centrifugal force is interfered with by the velocity and direction at which they are introduced into the chamber, and also by the currents produced in the fluid within the chamber due to it being introduced therein, together with the seeds, at substantial velocity and in a substantially radial direction. The tendency for this initial radial movement of the seeds and fluid to interfere with the separation of light and heavy seeds is intensified when the apparatus is operated at a comparatively slow speed, as is preferable with some kinds of seeds.

Another cause of disturbing currents within the separating chamber in previous constructions was due to the provision of only a single peripheral row of discharge openings for the heavy seed, so that when a large volume of seed is passing through these openings an outward current of fluid is thereby created and unless provision is made for the fluid thus escaping to be replaced from outside the chamber at a point near the outlets, the escaping fluid will be drawn from the central part of the chamber, thereby creating a radial current which may interfere with the desired separation. Also in this former apparatus the maximum efficiency of the separation is not obtained due to the seeds being caused to move a comparatively short distance between the intake and discharge openings in a direction longitudinally of the axis of the separating chamber, thus restricting the time when centrifugal force is acting to separate the light and heavy seeds.

In the drawing Figure 1 is a mid-sectional elevation of an apparatus constructed in accordance with the present invention and broken away in part.

Figure 2 is a transverse section on the line 2—2 of Figure 1 on a reduced scale.

The present invention has been devised to improve the separation and increase the capacity of the apparatus by: (a) providing means effectively to distribute and disperse the seeds before they are directed into the separating section of the rotating fluid-filled chamber, thus preventing crowding and mechanical interference with the natural course of individual seeds under centrifugal force; (b) introducing the seeds and accompanying fluid in a direction substantially parallel with the axis of the rotating chamber rather than radially, thus facilitating the radial movement of the seeds under centrifugal force and also avoiding the creation of radial currents in the fluid; (c) providing a plurality of rows of discharge openings in the outer wall of the separating chamber to facilitate the discharge therefrom of heavy seeds and eliminate or minimize the creation of radial currents within the chamber; (d) subjecting the seeds to the influence of centrifugal force for the maximum length of time by causing them to move substantially the whole length of the separating chamber from the point of entry at one end to the discharge outlets at the opposite end.

In the form of apparatus shown herein a suitable supporting frame 1 is provided having a tubular shaft 2 vertically mounted therein in suitable bearings, one of which is shown at 3, the shaft 2 extending downwardly centrally of an outer casing 4.

A spider member 7 is mounted on the hollow shaft 2 having a series of peripherally spaced vanes 8 forming ports 9 therebetween, and a downward cylindrical extension 10 extends from the outer ends of the vanes 8 and supports an annular closure member 11 within the upper end of the casing 4 and spaced from the wall thereof, this member 11 forming the top of an enclosed rotor and having on its upper face curved vanes 11' similar to those of a centrifugal pump.

The upper end of the casing 4 is flanged inwardly as indicated at 12 to overlap the annular member 11 and vanes 11' in spaced relation, and a cylindrical sleeve 13 is mounted thereon which presents a substantial sealing relation to the cylindrical extension 10, preferably without actual contact.

An annular discharge casing 14 with an outlet 14' is fitted on the upper end of the casing 4, forming a discharge chamber 15 which is in communication with the interior of the cylindrical member 10 through the ports 9. An annular baffle member 16 extends inwardly from the wall of the casing 4 intermediately between the annular members 11 and 12 with its inner periphery spaced from the sleeve 10 to provide a passage from the chamber 17 to the interior of the casing 4 between the vanes 11', which by their pump effect reduce the pressure in chamber 17 and leakage through seal between 10 and 13.

A seed-receiving and distributing member 18 consists of a hub 19 threaded onto the lower end of the tubular shaft 2, and a downwardly extending and diverging tubular portion 21 connected with the boss 20 by a plurality of substantially radial or curved vanes 22.

The boss 20 is apexed at 20' so that it presents a surface flaring downwardly and outwardly, and a closing or clamping plate 24 is here shown with walls which flare outwardly and upwardly as continuations of the flaring surfaces of the boss 20, a clamping screw 25 being inserted through the member 24 into the apexed portion of the boss 20.

A ring member 23 is supported by the member 24 and has a plurality of inwardly extending vanes 23' so shaped as to assist in impelling liquid and seed upwardly into the separating chamber 26' formed by the upwardly diverging bowl 26 clamped between the downwardly flanged periphery of the ring 11 and the outer periphery of the member 23.

The inner diameter of the ports between the vanes 23' of this ring member 23 through which the seed enters the separating chamber 26' can be varied by the use of interchangeable annular baffle plates of different diameters, one of which is shown at 22'. These annular baffles are preferably incorporated as integral parts of interchangeable ring members 23 and, together with interchangeable members 24, allow the selection of the most suitable inner and outer diameters of the ports between the vanes 23'.

A peripheral series of discharge openings 27 is formed in the wall of the separating bowl 26 adjacent to the upper or larger end thereof and a second peripheral series of openings 28 is also formed in the wall of the bowl above the openings 27 with the openings 27 and 28 arranged in offset relation and slightly overlapping.

A funnel-like casing 29 provided with a vertical or spiral baffle plate 29' or plates in its lower portion to reduce the rotation of the liquid within the said casing is peripherally clamped to the bottom of the casing 4 and terminates in a suitable valve-controlled outlet 29''.

A fluid supply conduit 30 has a valve-controlled branch 31 connected with an inlet passage 32 leading to the annular chamber 17 above the baffle 16. Within the tubular shaft 2 is supported a stationary tubular conduit 2' through which the seed to be classified is fed at a desired rate, and the fluid is also supplied to the upper end thereof at a desired relative rate by means of a valve-controlled conduit 33, a suitable arrangement for effecting the feeding being shown in my earlier United States Patent 1,452,457 previously referred to.

In the operation of the apparatus described the liquid, which is chosen of a specific gravity between those of the seeds to be separated, is supplied to the conduit 30 by a suitable pumping means, and the valve conduit 31 may be opened and sufficient brine supplied to fill the casing 29 and also fill the casing 4 including the interior of the bowl 26 until overflow occurs through ports 9 and discharge 14', when the valve 33 is opened so that the desired amount of the fluid will be supplied to the interior of the conduit 2' while at the same time the seeds or grain will be released thereinto at a desirable rate.

During operation the casings 4 and 29 are completely filled with liquid and the separating chamber 26 is also full of liquid from the bowl wall 26 in as far as the line 30 representing the inner surface of the rotating liquid body, the location and slope of which surface will vary with the speed, rate of feed and amount of discharge through the ports 9.

The seeds and fluid falling through the conduit 2' will strike the apex portion 20' and will be deflected radially and at the same time will have imparted thereto a rotating motion proportional to that of the bowl 26 which is driven in any suitable manner.

The annular space 24' within the member 24 allows a dispersal of the seeds entering it from the vanes 20, and the vanes 23' are so arranged in number and in form and the slope of the interior surface of the member 24 is such as to deliver the seed into the separating chamber 26' in a direction parallel to the axis and evenly dispersed in the liquid.

Thus when the seeds reach the lower interior of the bowl 26 which is rapidly revolving together with the solution of liquid therein, the heavier seeds will travel outwardly through the liquid due to centrifugal force until they reach the upwardly and outwardly tapering wall of the bowl 26, where they will be caused to travel upwardly along this wall until they reach the openings 27 or 28. At the same time the seeds which are lighter than the liquid will be effectively separated from the heavier outwardly-thrown seeds, and displaced toward the axis of the bowl to the inner surface of the liquid 30 where they will be carried upward by the current through the tubular portion 10 and the ports 9 and discharged along with a stream of liquid into the annular chamber 15 and out through the discharge 14'.

A continuous stream of liquid flows down the feed tube 2' carrying with it the seeds to be separated, and a continuous discharge of liquid and light seeds passes through the ports 9 and the discharge chamber 15 and outlet 14'. There is also a continuous flow of liquid through the chamber 17, between the baffle 16 and the bowl top 11, assisted by the vanes 11', against the centrifugal pressure set up by the rotation of the bowl 26, and down past the openings 28 and 27, between the bowl wall 26 and the casing wall 4, which will effectively carry the heavy seeds discharged from the bowl to the outlet 29" from the casing 29.

The fluid is allowed to escape from the bottom at valve 29" of the chamber 29 at a rate sufficient to carry all the heavy seed with it, and the rate of entry into the tube 2' and the chamber 17 may be accurately proportioned to maintain a condition where there is no current through the openings 27 and 28, i. e. the discharge of liquid through the ports 9 is substantially equal to the feed through the tube 2', and the liquid discharged from the outlet 29" of the casing 29 is substantially equal to that fed through the inlets 31, 32 and 17.

The openings 27 and 28 will permit, under certain conditions, a localized current of liquid to flow inwardly through the upper openings and outwardly through the lower ones assisting in carrying the heavy separated material with it into the casing 4.

The combination of the double set of outlets 27 and 28 and the specially shaped inlet members 18, 23 and 24 make possible the maintenance of a hollow body of liquid under centrifugal force in the separating chamber 26' with an upward and inward current to its inner surface 30, and without other currents which might impair the separation under centrifugal force.

The feeding of the seeds into the lowermost or smallest extremity of the rotating bowl and removal of both the heavy and light seeds at the top provides a more efficient separation in that the maximum distance of travel will be presented for the seeds while they are under the separating influence of centrifugal force, permitting a more efficient, rapid and uniform segregation of the heavy from the light seeds, and the tendency in prior constructions for the light seeds to be carried along with the heavy seeds is eliminated.

In some cases it is important to control the degree of centrifugal force to which the material is subjected on its entry into the separating chamber without the necessity for changing the bowl speed. By the use of the interchangeable members 22' or 23 and 24 it is possible to introduce the material to be separated, or at least its lighter components, into the separating chamber 26' at a point at or near the inner surface 30 of the liquid, thus avoiding the compression of soft particles, or the expulsion by pressure of contained air. In other cases the best separation is obtained when the material is introduced into the separating chamber at a greater distance from the axis or near the bowl wall 26.

What I claim as my invention is:

1. A centrifugal seed or grain classifier of the liquid-charged type having in combination a bowl rotor mounted in a liquid-filled casing, means for feeding the seeds or grain into the lower region of the rotor, means for removing the lighter seeds from the upper end of the rotor, means other than the charging liquid for causing the heavier seeds to travel upwardly within said rotor, said rotor having discharge outlets for the said heavier seeds at the upper end thereof, and means for conducting the said heavier seeds from said upper outlets, said bowl comprising a single thin walled shell diverging upwardly at a very slight uniform angle from bottom to top, and said discharge outlets comprising spaced peripherally elongated openings formed in the thin bowl wall at the upper end only in peripheral rows one immediately above the other with the openings of one row disposed between the openings of the next row in overlapping relation.

2. A centrifugal seed or grain classifier of the liquid-charged type having in combination a rotor of inverted frustro-conical form, means for feeding the seeds or grain into the lower region of the rotor, means for separately releasing the classified seeds from the upper larger end of the rotor, and means for continuously conducting away the released heavier seeds, including impeller means operating in synchronism with the rotor for directing an annular flow of liquid exteriorly of said bowl into the path of the released heavier seeds to continuously conduct same away from the point of release.

3. A centrifugal seed or grain classifier of the liquid-charged type having in combination a rotor of inverted frustro-conical form, means for feeding the seeds or grain into the lower region of the rotor, means for separately releasing the classified seeds from the upper or larger end of the rotor including discharge openings for the heavier seeds in the rotor wall at the upper larger end, an outer liquid-flooded stationary casing enclosing said rotor and receiving the heavier seeds from said rotor discharge openings, and means for directing a flow of the liquid medium downwardly past said openings on the outward side of the rotor within said stationary casing at a pressure substantially proportional to the speed of operation of said rotor to minimize liquid interchange between the interiors of said rotor and stationary casing and conduct the heavier seeds away.

4. A centrifugal seed or grain classifier of the liquid-charged type including in combination an outer casing, an inner rotary classifier bowl spaced therefrom, tubular extensions from the upper ends of the bowl and casing rotatably inter-fitting to form a substantial seal, a discharge chamber for light seeds spaced above and communicating with the bowl interior through the bowl tubular extension, means for distributing seeds in the lower region of the bowl, discharge openings for the heavier seeds in the upper end of the bowl for releasing seeds into the space between the bowl and casing, liquid inlet means in the casing between said discharge chamber and the bowl, and means for impelling liquid downwardly from said latter means with a force proportional to the speed of rotation of said rotary classifier bowl past the heavy seed discharge openings of the bowl into the space between the bowl and casing to conduct the released heavier seeds downwardly.

5. A centrifugal seed or grain classifier of the liquid-charged type including in combination an outer casing, an inner rotary classifier bowl spaced therefrom, tubular extensions from the upper ends of the bowl and casing rotatably inter-fitting to form a substantial seal, a discharge chamber for light seeds spaced above and communicating with the bowl interior through the bowl tubular extension, means for distributing seeds in the lower region of the bowl, discharge openings for the heavier seeds in the upper end of the bowl for releasing seeds into the space between the bowl and casing, liquid inlet means in the casing between said discharge chamber and the bowl, and means for impelling liquid downwardly from said latter means with a force proportional to the speed of rotation of said rotary classifier bowl past the heavy seed discharge openings of the bowl into the space between the bowl and casing to conduct the released heavier seeds downwardly, said liquid impelling means including impeller means connected with the rotary bowl and disposed within the inlet above the bowl to assist entry of the liquid into the casing in opposition to the centrifugal force set up by the rotating bowl within the main body of the casing, and to minimize leakage of liquid past said seal.

EDGAR D. EDDY.